(12) United States Patent
Rosier

(10) Patent No.: US 9,878,579 B2
(45) Date of Patent: Jan. 30, 2018

(54) TRACTION MAT

(71) Applicant: MUSTHANE, Willems (FR)

(72) Inventor: Reza Rosier, Dottignies (BE)

(73) Assignee: MUSTHANE, Willems (FR)

( * ) Notice: Subject to any disclaimer, the term of this patent is extended or adjusted under 35 U.S.C. 154(b) by 0 days.

(21) Appl. No.: 15/300,286

(22) PCT Filed: Feb. 27, 2015

(86) PCT No.: PCT/FR2015/050477
§ 371 (c)(1),
(2) Date: Sep. 29, 2016

(87) PCT Pub. No.: WO2015/150650
PCT Pub. Date: Oct. 8, 2015

(65) Prior Publication Data
US 2017/0136817 A1 May 18, 2017

(30) Foreign Application Priority Data

Apr. 1, 2014 (FR) .................................. 14 52872
Dec. 2, 2014 (FR) .................................. 14 61763

(51) Int. Cl.
B60B 39/12 (2006.01)

(52) U.S. Cl.
CPC ......... B60B 39/12 (2013.01); B60B 2900/111 (2013.01); B60B 2900/313 (2013.01); B60B 2900/541 (2013.01); B60B 2900/551 (2013.01)

(58) Field of Classification Search
CPC ........................ B60B 39/12; B60B 2900/111
(Continued)

(56) References Cited

U.S. PATENT DOCUMENTS 1,004,861 A 10/1911 Ek
1,375,666 A 4/1921 Bauer
(Continued)

FOREIGN PATENT DOCUMENTS

DE 3122441 A1 12/1982
FR 2424138 A1 11/1979
(Continued)

OTHER PUBLICATIONS

French Preliminary Search Report dated Jul. 17, 2015, French Application No. 1461763, pp. 1-2.
(Continued)

Primary Examiner — Jason C Smith
(74) Attorney, Agent, or Firm — MH2 Technology Law Group, LLP

(57) ABSTRACT

The invention relates to a roll-up traction mat (10) for a vehicle (V) having at least one wheel (R1), said traction mat comprising a main track portion (12), and a track starter tab (20) that is fastened to one of the ends of the main track portion (12) by a hinge-forming connection portion (22) arranged to lower the track starter tab relative to the main track portion, by means of which the track starter tab can be positioned at the bottom of a rut (O) in which said wheel of the vehicle is stuck. The track starter tab comprising a plurality of transverse stiffener elements and a top face provided with studs. The track starter tab and the main track portion are constituted by at least one textile layer covered in a polymer layer.

19 Claims, 7 Drawing Sheets

(58) Field of Classification Search
USPC .......................................................... 238/14
See application file for complete search history.

(56) References Cited

U.S. PATENT DOCUMENTS

| | | | |
|---|---|---|---|
| 1,410,055 A * | 3/1922 | Brian ..................... | B60B 39/12 |
| | | | 238/14 |
| 1,863,316 A | 6/1932 | Webster, Jr. | |
| 2,135,901 A | 3/1935 | Lea | |
| 3,256,785 A | 6/1966 | Stammbach et al. | |
| 3,425,624 A * | 2/1969 | Jacobs .................... | B60B 39/12 |
| | | | 238/14 |
| 3,458,884 A | 8/1969 | Gurganious | |
| 3,701,474 A * | 10/1972 | Weiz ....................... | B60B 39/12 |
| | | | 14/73 |
| 3,918,638 A | 11/1975 | Nelson | |
| 4,121,765 A * | 10/1978 | Fosteris ................. | B60B 39/12 |
| | | | 238/14 |
| 4,211,366 A * | 7/1980 | Czarnota ................ | B60B 39/12 |
| | | | 238/14 |
| 4,998,670 A * | 3/1991 | Peterson ................ | B60B 39/12 |
| | | | 238/14 |
| 5,118,542 A | 6/1992 | McLeod | |
| 5,119,587 A | 6/1992 | Waltz | |
| 5,186,574 A | 2/1993 | Tavares | |
| 5,204,159 A * | 4/1993 | Tan .......................... | E01O 5/20 |
| | | | 15/215 |
| 5,282,692 A | 2/1994 | McLeod | |
| 5,439,171 A | 8/1995 | Fruend | |
| D364,837 S * | 12/1995 | Hargrove ................ | D12/400 |
| 5,538,183 A * | 7/1996 | McGee .................. | B60B 39/12 |
| | | | 238/14 |
| 5,862,983 A * | 1/1999 | Andrus ................... | E01C 9/08 |
| | | | 238/14 |
| 6,089,784 A | 7/2000 | Arden | |
| 6,394,362 B1 | 5/2002 | Kramr | |
| 6,652,184 B1 | 11/2003 | Knafelc | |
| 6,696,122 B1 | 2/2004 | Deschamps | |
| 6,722,814 B2 | 4/2004 | Byrne | |
| 7,162,760 B2 * | 1/2007 | Schweitzer ............ | E04G 1/36 |
| | | | 14/69.5 |
| 7,634,876 B2 | 12/2009 | Moller | |
| D615,032 S | 5/2010 | Pinto | |
| D617,263 S * | 6/2010 | Pitsolis ................. | D12/608 |
| 7,941,983 B2 | 5/2011 | Wheeler | |
| 8,167,219 B2 * | 5/2012 | Lynn ..................... | B60B 39/12 |
| | | | 238/14 |
| 8,215,568 B1 * | 7/2012 | Pitsolis ................. | B60B 39/12 |
| | | | 238/14 |
| 8,231,066 B2 * | 7/2012 | McCarthy ............. | B60B 39/12 |
| | | | 238/14 |
| 8,448,877 B1 * | 5/2013 | Aubin .................... | B60C 27/00 |
| | | | 238/14 |
| 8,784,002 B2 | 7/2014 | Ringus et al. | |
| 9,067,463 B2 * | 6/2015 | Moses .................... | B60B 39/12 |
| 9,150,050 B2 * | 10/2015 | Lynn ..................... | B60B 39/12 |
| D764,997 S * | 8/2016 | Juchniewicz .......... | D12/203 |
| D775,068 S | 12/2016 | Wippler | |
| 2006/0222804 A1 | 10/2006 | Banting | |
| 2012/0321382 A1 | 12/2012 | Rosier | |
| 2015/0361624 A1 | 12/2015 | Rosier | |
| 2016/0083926 A1 | 3/2016 | Rosier | |

FOREIGN PATENT DOCUMENTS

| | | |
|---|---|---|
| FR | 2824088 A1 | 10/2002 |
| FR | 2825388 A1 | 12/2002 |
| FR | 2866908 A1 | 9/2005 |
| FR | 2874940 A1 | 3/2006 |
| GB | 2019792 B | 7/1982 |
| WO | 02/006742 A1 | 8/2002 |
| WO | 2010/134735 A2 | 11/2010 |

OTHER PUBLICATIONS

French Preliminary Search Report dated Nov. 21, 2014, French Application No. 1452872, pp. 1-2.
USPTO Non-Final Office Action dated Jun. 22, 2017, U.S. Appl. No. 15/323,442, pp. 1-12.

* cited by examiner

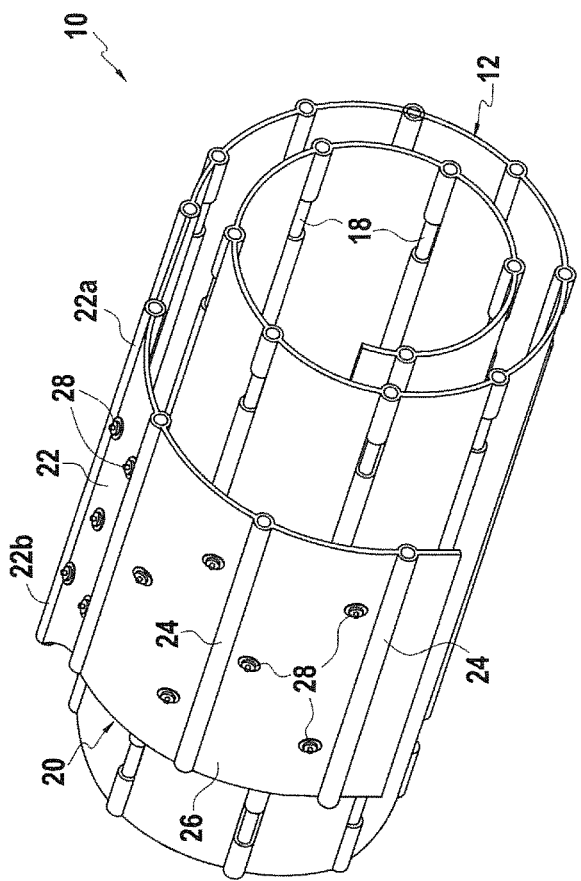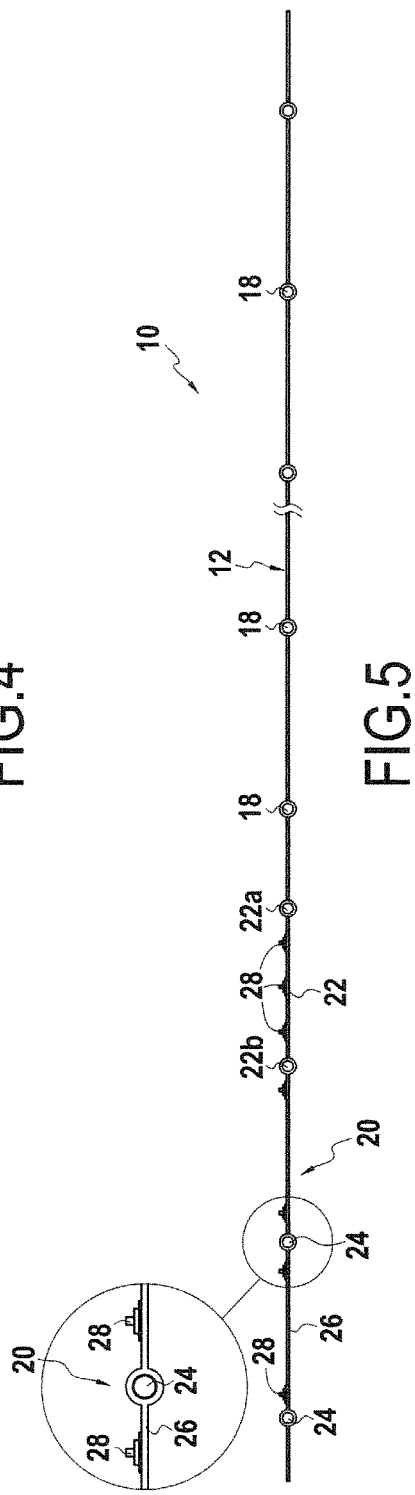
FIG.4
FIG.5

TRACTION MAT

BACKGROUND OF THE INVENTION

The present invention relates to the field of devices for recovering wheeled vehicles, of the car or truck type.

It is known that a wheeled vehicle can become stuck in the ground. When the vehicle is stuck, at least one of its drive wheels slips and digs into the ground forming a rut into which it sinks. The rut presents the shape of an indentation formed in the ground. The wheel is then trapped at the bottom of the rut so that the vehicle is no longer able to move forwards.

A vehicle can become stuck in this way in sand or in mud. This is referred to as getting bogged down.

The vehicle recovery device of the invention thus makes it possible to recover a vehicle trapped in sand or mud, as the case may be.

In order to recover a vehicle, it is known to use rigid plates, made of plastic or of metal, that are placed in the rut under the drive wheel that is stuck. The wheel thus finds a support allowing it to run without slipping and to move forwards onto the plate, by means of which the vehicle can be freed from the rut.

A drawback of such a plate is its size. In order to overcome this problem, rigid plates are known that are constituted by several plate portions that are fastened to one another so as to make up the plate. Although such a recovery device is more compact, it presents in contrast the drawback of requiring assembly and disassembly times that are quite long. Furthermore, the plate is somewhat fragile. Finally, if the plate portions are not correctly cleaned after use, it may be difficult to re-assemble the plate, e.g., because of mud that is lodged between the plate portions.

Traction mats such as the mat proposed in U.S. Pat. No. 3,701,474 are also known. However, that type of mat, formed by rigid plates connected together by hinge-forming rings does not present flexibility that is sufficient for enabling the mat to slide into the rut effectively, underneath the stuck wheel. Furthermore, in practice, it should be observed that the transverse grip elements alone do not suffice to prevent the wheel from slipping and therefore do not suffice to guide the tire out of the rut. In addition, that mat is particularly inconvenient to transport.

OBJECT AND SUMMARY OF THE INVENTION

An object of the present invention is to propose a recovery device that overcomes the above-mentioned drawbacks.

To do this, the invention provides a roll-up traction mat for a vehicle having at least one wheel, said traction mat having a bottom face and a top face constituting a running track, and comprising a main track portion, as well as a track starter tab that is fastened to a first end of the main track portion by a hinge-forming connection portion arranged to lower the track starter tab relative to the main track portion, by means of which the track starter tab can be positioned at the bottom of a rut in which said wheel of the vehicle is stuck, the track starter tab comprising a plurality of stiffener elements extending transversely and a top face provided with studs, the main track portion and the track starter tab being constituted by at least one textile layer covered in a polymer layer.

A first advantage of the traction mat of the invention is its compactness when it is in the rolled up position, by means of which it can thus be easily transported. Furthermore, it does not need to be assembled, or in a variant embodiment in which the track starter tab can be separated from the main track portion, it can be assembled very simply. The mat is also much lighter and easier to handle than a set of metal vehicle recovery plates.

When the track starter tab is lowered relative to the main track portion, the track starter tab extends in a plane that extends below the plane of the main track portion. The track starter tab can be guided to the bottom of the rut, while the main track portion remains substantially parallel to the ground, above the rut.

It should therefore be understood that the track starter tab, and possibly also the hinge-forming connection portion, form a slope that is inclined relative to the main track portion, making it possible to free the stuck wheel from the rut. By means of the invention, the stuck wheel, e.g. one of the drive wheels, grips the track starter tab, runs on the track starter tab and gets itself out from the rut by getting onto the main track portion. The vehicle thus runs on the main track portion, preferably until its other wheels have also been extracted from the ruts by running on the track starter tab and on the main track portion.

In advantageous manner, the track starter tab is flexible, whereby it can be inserted easily under the stuck wheel.

In an embodiment, the hinge-forming connection portion is a hinge directly connecting the track starter tab to the main track portion.

In a preferred embodiment, the hinge-forming connection portion is a flexible portion connecting the track starter tab to the main track portion. The flexible portion is thus arranged to pivot relative to the track starter tab, and relative to the main track portion, whereby the track starter tab can be lowered relative to the main track portion in such a manner that the tab extends in a plane situated below the plane of the main track portion.

In the invention, the studs disposed on the top face of the track starter tab have the effect of making it easier to grip the tire of the stuck wheel. These studs become engaged in the tire so as to avoid the wheel slipping on the track starter tab.

The studs are preferably, but not exclusively, constituted by metal fittings projecting from the top face of the track starter tab. However, provision may be made for studs of other types.

Advantageously, at least the track starter tab includes a plurality of stiffener elements extending transversely.

One advantage of the presence of stiffener elements is that they stiffen the track starter tab so as to avoid it becoming folded under a wheel. It is therefore understood that this makes it possible to further improve the effectiveness of the traction mat.

The synergy between the presence of the studs and of the stiffener elements thus serves to facilitate substantially the recovery of the vehicle.

In a preferred variant, the main track portion is also provided with transverse stiffener elements, which are preferably integrated in the top track portion.

In accordance with the invention, the main track portion and the track starter tab are constituted by at least one textile covered in a layer of polymer, preferably an elastomer. Such a material presents the advantage of being flexible, waterproof, strong, and lightweight, as well as enabling the mat to be cleaned quickly.

The polymer layer is preferably provided with indentations so as to further improve the grip of the tire. In another variant, the studs are protrusions from the polymer layer. Preferably, the main track portion and the track starter tab are constituted by two superposed textile layers, and the stiffener elements are disposed between the two textile layers.

In a particularly advantageous aspect of the invention, the track starter tab presents a width that is substantially less than the width of the main track portion.

One advantage is that the track starter tab moves down into the rut while the main track portion, which is wider, presses against the ground, outside the rut, while remaining substantially parallel to the ground, and does so without sliding into the rut because of its width, which is substantially greater than the width of the rut.

Such an arrangement contributes to facilitating recovery of the vehicle.

Another advantage of providing a tab of width that is small compared to the width of the main track portion is that the user can place the track starter tab under the stuck wheel more easily, which makes it easier to grip the tire and recover the wheel.

Preferably, the track starter tab presents a width lying in the range 15 centimeters (cm) to 40 cm. Such a range of widths corresponds substantially to the average range of widths for vehicle wheels.

In a preferred embodiment, the hinge-forming connection portion is flexible. One advantage is that the connection portion thus forms a curved slope connecting the track starter tab to the main track portion, thereby improving the grip of the tire that has the track starter tab and the connection portion wrapped around part of its circumference.

Advantageously, the hinge-forming connection portion presents a first end edge connected to the main track portion and a second end edge connected to the track starter tab, the width of the first end edge being greater than the width of the second end edge. This reduction in width, between the main track portion and the track starter tab, improves the strength of the hinge-forming connection portion.

In an advantageous embodiment, the main track portion presents a length that is substantially greater than the length of the track starter tab. This makes it possible for the vehicle to gain momentum after the stuck wheel has been extracted from the rut, in such a manner that the other wheels can also get out of the rut. Thus, the risk of the vehicle getting stuck in the proximity of the rut is limited. The track starter tab presents a length that is both necessary and sufficient to enable the wheel to get out of the rut and get onto the main track portion.

Preferably, the track starter tab presents a width lying in the range 30 cm to 70 cm. Also preferably, but not exclusively, the main track portion presents a length lying in the range 1 meter (m) to 10 m.

In order to further improve the grip of the wheel on the traction mat, the main track portion and/or the hinge-forming connection portion, also comprises a top face that is preferably provided with studs that extend in continuity with the studs of the track starter tab.

In a variant, the track starter tab is detachable from the main track portion, which makes it easy to replace in the event of the tab being damaged.

In an advantageous aspect of the invention, the main track portion presents a second end, remote from the first end and the track starter tab, which second end includes means for fastening the mat to the ground. The fastener means improve hold on the ground, in particular when the wheel engages in the track starter tab. In particular, this avoids the mat sliding under the wheel and into the rut, which would prevent the bogged down wheel from being extracted.

Preferably, the means for fastening the mat to the ground comprise at least one orifice with which fastener members co-operate. The fastener members are preferably, but not exclusively, fastener clips, pegs, or anchoring devices, such as those described in WO 2014/170574. The fastener members co-operate with the fastener orifices so as to improve the mat's hold on the ground. It should be understood that the use of fastener members coupled with the fastener orifices holds the mat effectively while presenting fastener means that are simple to install and to use.

In an advantageous aspect of the invention, the traction mat further comprises at least one grip device for improving grip of the tire of the stuck wheel, said grip device extending in the transverse direction by projecting from the top track face while being fastened to the traction mat by at least one fastener element so as to form a non-slip track shoe. Preferably, the grip device is disposed at least on the main track portion.

It should be understood that the transverse direction corresponds to the width of the mat. Since the grip device extends in the transverse direction it does not hinder folding or rolling up the mat.

In the invention, the grip device is rigid. It is advantageously made of a metal, of a composite, or of a plastics material. In order to improve grip, the projecting portion of the grip device is not covered in the material constituting the traction mat, in particular a polymer.

In preferred manner, the mat includes a plurality of grip devices, which are distributed over all or part of the length of the mat.

Advantageously, the grip device is a separate part, which is fastened to the mat by means of the fastener element.

In an alternative, the grip device is a fitting, that is separate from the stiffener elements and that is secured to the mat during manufacture, e.g. during a vulcanization operation.

Preferably, the grip device extends continuously across more than half the width of the mat, preferably across the entire width of the mat. In a variant, the grip device extends in discontinuous manner across the width of the mat. In this configuration, the grip device is preferably constituted by portions of grip devices that are spaced apart from one another, each portion being fastened to the traction mat by at least one fastener element.

Advantageously, the grip device comprises:
  a support disposed on the top track face and extending in the transverse direction while being fastened to said traction mat by the fastener element; and
  a first grip plate projecting from the support and extending in the transverse direction of the mat, in such a manner as to extend in a surface transverse to the top track face.

Preferably, the support and/or the first grip plate extend across substantially the entire width of the mat, in continuous or discontinuous manner. Also preferably, the support presents the shape of a blade that extends transversely and parallel to the top track face.

Preferably, the first grip plate extends in a surface that is substantially orthogonal to the support. Considered in the cross-section of the grip device, the unit constituted by the support and the first blade is in the shape of an "L" or "U" or "V" or of an upside-down "T".

Still preferably, the first grip plate is in the shape of a blade that extends in a plane orthogonal to the top track surface.

Preferably, but not exclusively, the fastener element is a fastener screw that secures the support to the mat. In an advantageous variant, the fastener element passes through the thickness of the mat so as to improve the hold of the grip device on the mat.

Still preferably, the support is fastened to the mat by a plurality of fastener elements.

In an advantageous embodiment, the support and the first grip plate form a single part constituting a first rigid section member extending in the transverse direction of the mat. This rigid section member preferably extends in a rectilinear direction, presenting an upside-down "T"-shaped cross section, or an "L" or "U" or "V"-shaped cross section.

Advantageously, the section member is a rigid part that is made of a metal, plastics, or composite material, or any other rigid material.

Preferably, but not exclusively, the fastener element is fastened by screw-fastening. By way of example, it is a unit constituted by a bolt and a nut.

In an advantageous aspect of the invention, the grip device further comprises a counter-support disposed on the bottom face while being fastened to the support by the fastener element.

By means of said counter-support, the fastening of the grip device to the traction mat is improved substantially.

It should be understood that the mat is then clamped between the support and the counter-support, which are fastened together by means of the fastener element, said element passing through the mat in its thickness direction.

In a preferred embodiment, the grip device further comprises a second grip plate projecting from the counter-support and extending in the transverse direction, in such a manner as to extend in a surface that is transverse to the bottom face of the mat.

The second grip plate thus forms a non-slip track shoe that makes it possible for the mat not to slide relative to the ground when a vehicle is engaged or running on the mat.

Preferably, the second grip plate is substantially orthogonal to the bottom face of the mat.

Also, the first and second plates extend orthogonally to the traction mat on either side of said mat.

In an advantageous variant, the second plate and the counter-support form a single part and constitute a second rigid section member that extends in the transverse direction of the mat. Preferably, the cross-section is in the shape of an upside-down "T", or of an "L" or "U" or "V" shape.

Advantageously, in order to improve the hold of the mat on the ground, the fastener element presents a top end fastened to the support and a bottom end fastened to the counter-support forming a protrusion extending beyond the counter-support so as to form a non-slip track shoe.

Preferably, the fastener element passes through the counter-support while extending the ground so as to form a non-slip track shoe.

In another advantageous aspect of the invention, the main track portion comprises at least two series of grip devices forming two separate and parallel grip strips that extend in the longitudinal direction, while defining two zones for passing the wheels of the vehicle.

Disposing the grip devices only in the zones for passing the wheels, reduces the weight of the traction mat.

BRIEF DESCRIPTION OF THE DRAWINGS

The invention can be better understood on reading the following description of an embodiment of the invention given by way of non-limiting example, with reference to the accompanying drawings, in which:

FIG. 4 shows the traction mat of FIG. 3 in a rolled-up position;

FIG. 5 is a side view of the FIG. 3 mat, showing more particularly the studs of the track starter tab;

DETAILED DESCRIPTION OF THE INVENTION

Figure 1:
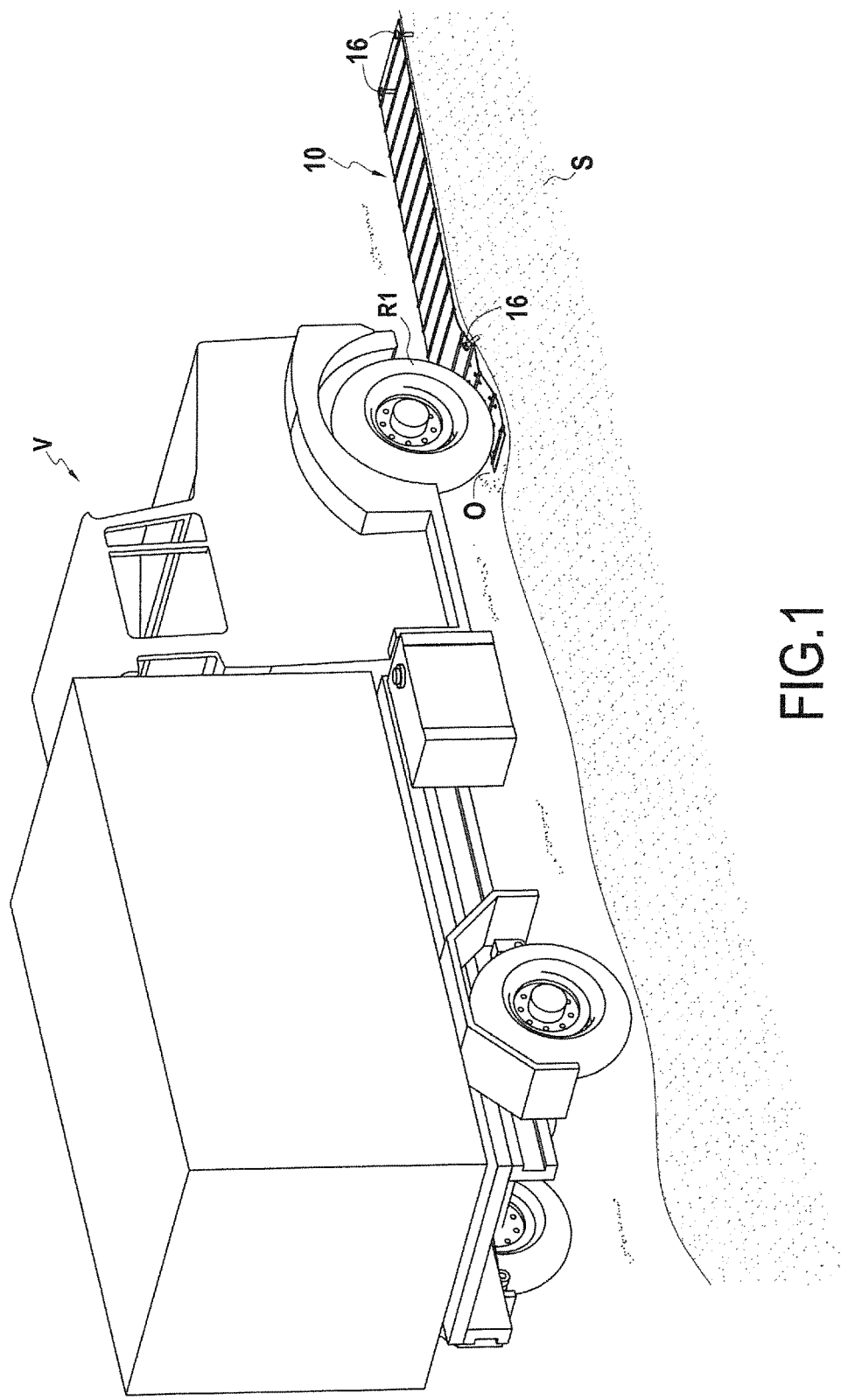
FIG. 1 shows a vehicle that is stuck, with a traction mat of the invention placed in front of the vehicle.
Figure 2:
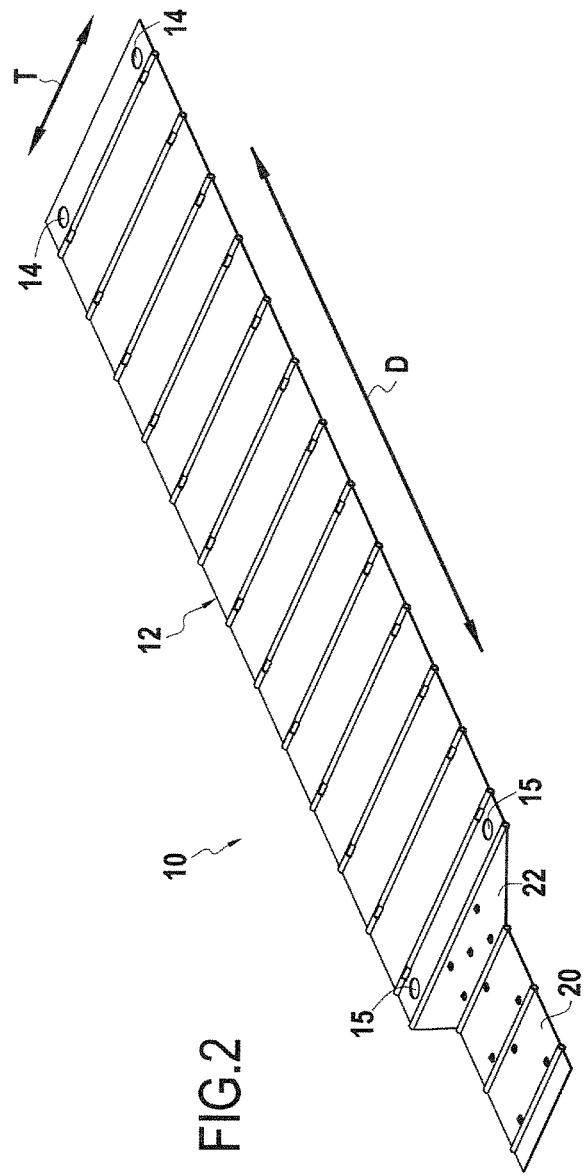
FIG. 2 is a perspective view of the traction mat of the invention.

FIG. 1 shows a vehicle V that is stuck in sand S. In this example, the vehicle V includes a front drive wheel R1 that is stuck at the bottom of a rut O. Said rut O was formed in the sand because of slipping of the front drive wheel R1.

In order to recover the vehicle V and more precisely in order to extract it from the sand, a traction mat 10 of the present invention is used. More precisely, the traction mat 10 is used in this example for recovering the front drive wheel R1 by extracting it from the rut O.

The traction mat is disposed ahead of the front drive wheel R1.

As explained in more detail below, the front drive wheel R1 grips the traction mat and runs on it, thereby enabling the wheel R1 to be freed from the rut.

The traction mat 10 of the invention is described below in further detail with reference to FIGS. 2 to 5.

The traction mat 10 presents a longitudinal direction D and a transverse direction T. It presents a bottom track face 116 and a top track face 114. The traction mat 10 comprises a main track portion 12 that presents a length L1, considered in the longitudinal direction D, and a width l1, considered in the transverse direction T.

In this non-limiting example, the length L1 of the main track portion is of the order of 2 meters, while its width l1 is of the order of 1 meter.

Specifically, the main track portion 12 comprises a plurality of stiffener elements 18 made up of metal bars that extend across the width of the main track portion while being housed in the main track portion. These stiffener elements have the effect of stiffening the main track portion in its transverse direction so as to avoid said portion sinking when a vehicle passes over it.

Figure 3:
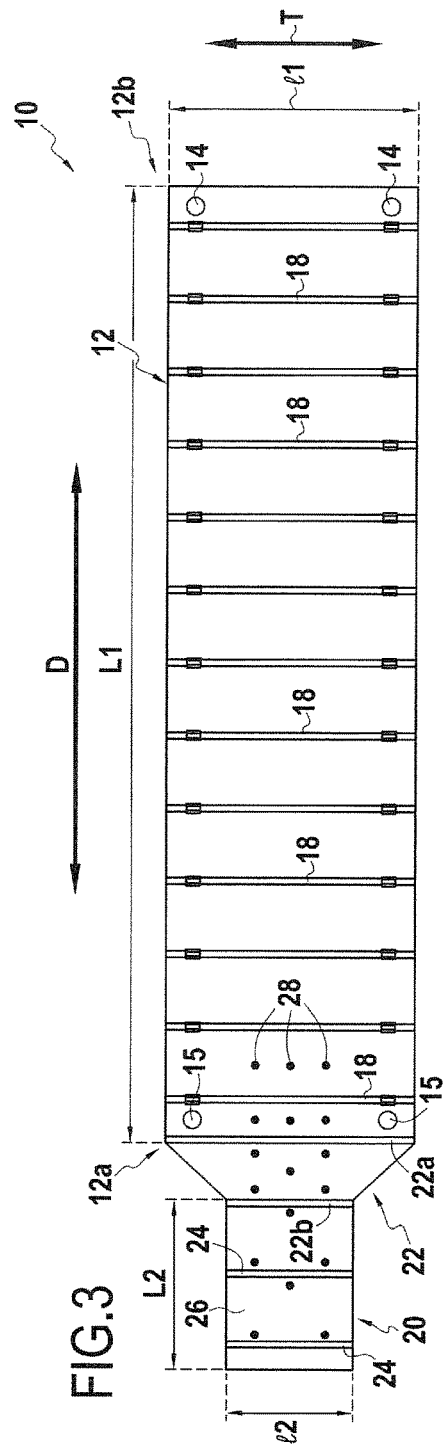
FIG. 3 is a plan view of the traction mat of FIG. 2.

As shown in FIG. 3, the traction mat 10 further comprises a track starter tab 20 that is fastened to a first longitudinal end 12a of the main track portion.

In this example, the track starter tab 20 is of substantially rectangular shape. Without going beyond the ambit of the present invention, it should be understood that the track starter tab 12 may present a shape that is different, e.g. it may present a free end that is slightly curved.

The track starter tab 20 presents a length L2 considered in the longitudinal direction D and a width l2 considered in the transverse direction T.

In a particularly advantageous aspect of the invention, the width l2 of the track starter tab 20 is substantially less than the width l1 of the main track portion 12, in such a manner as to enable it to be positioned easily in the rut O.

In this example, the width l2 of the track starter tab 20 presents a width of about 25 centimeters.

In practice, the width l2 of the track starter tab is selected in such a manner as to be substantially equal to the width of the wheel of the vehicle. A width lying in the range 15 cm to 40 cm could therefore be selected.

It can also be observed that the length L1 of the main track portion 12 is substantially greater than the length L2 of the track starter tab.

One advantage is to enable the wheel that was stuck to run over a distance that is long enough so as to ensure that the rear wheels can also get out of the rut.

In addition, the track starter tab 20 further includes stiffener elements 24 that extend transversely across its width, in such a manner as to stiffen the tab in its transverse direction so as to avoid it becoming folded or sliding under the wheel. As described above, these are likewise rigid bars, e.g. metal bars, that are housed, in this example, in the track starter tab.

In the invention, the track starter tab 20 is fastened to the first end 12a of the main track portion 12 by a hinge-forming connection portion 22. This connection portion 22 is arranged to lower the track starter tab 20 relative to the main track portion 12.

In this example, the hinge-forming connection portion presents a trapezoidal shape, its large base being constituted by a first end edge 22a connected to the main track portion 12, while its small base is constituted by a second end edge 22b connected to the track starter tab 20.

In this example, the hinge-forming connection portion 22 is hinged relative to the main track portion and relative to the track starter tab, respectively about pivot axes X1 and X2, by means of which the track starter tab can be lowered relative to the main track portion.

In this example, the hinge-forming connection portion 20 is flexible, as are the main track portion 12 and the track starter tab 20.

This flexibility makes it possible for the traction mat 10 to be rolled up, as shown in FIG. 4, in such a manner as to be able to be deployed quickly.

The stiffener elements 18 of the main track portion, and the stiffener elements 24 of the track starter tabs which extend in the transverse direction of the traction mat 10, confer transverse stiffness to the mat without impeding rolling up.

In order to guarantee that the wheel R1 grips the mat 10, in particular while beginning to exit the rut, the track starter tab includes a plurality of studs 28 that are disposed on the top face 26 of the tab.

In this example, the studs 28 are metal fittings that project from the top face 26 of the track starter tab and that cooperate with the tire.

In this example, the hinge-forming connection portion 22 is also provided with studs 28.

As can be seen in FIG. 3, the main track portion 12 presents a shape that is substantially rectangular, the corners of the second end 12b, remote from the track starter tab, include means for fastening the mat to the ground.

In this example, the fastener means comprise first fastener orifices 14 made in the mat and designed for receiving fastener clips or, more preferably, fastener members 16 making it possible to fasten the traction mat 10 to the ground S. An example of fastener members is described in document WO 2014/170574.

These fastener means make it possible to fasten the mat to the ground effectively and to thus prevent it rolling up under the wheel inside the rut when the wheel engages the traction mat.

In the example of FIG. 3, the first end also includes other fastener means that comprise second fastener orifices 15 designed to receive fastener members 17 of the same type as those described above. Without going beyond the ambit of the present invention, these other fastener means disposed at the first end 12a of the main track portion may be omitted.

In this example, the main track portion 12 and the track starter tab 20 are constituted by a textile covered in an elastomer layer. The same applies for the hinge-forming connection portion 22.

Such a material provides flexibility and excellent mechanical strength. It also makes it easier to clean the mat.

The stiffener elements 18 and 24 preferably extend in the thickness of the traction mat. More precisely, the mat is constituted in this example by two textile layers that are superposed on each other. In this example, the stiffener elements are disposed between the two textile layers.

Figure 6:
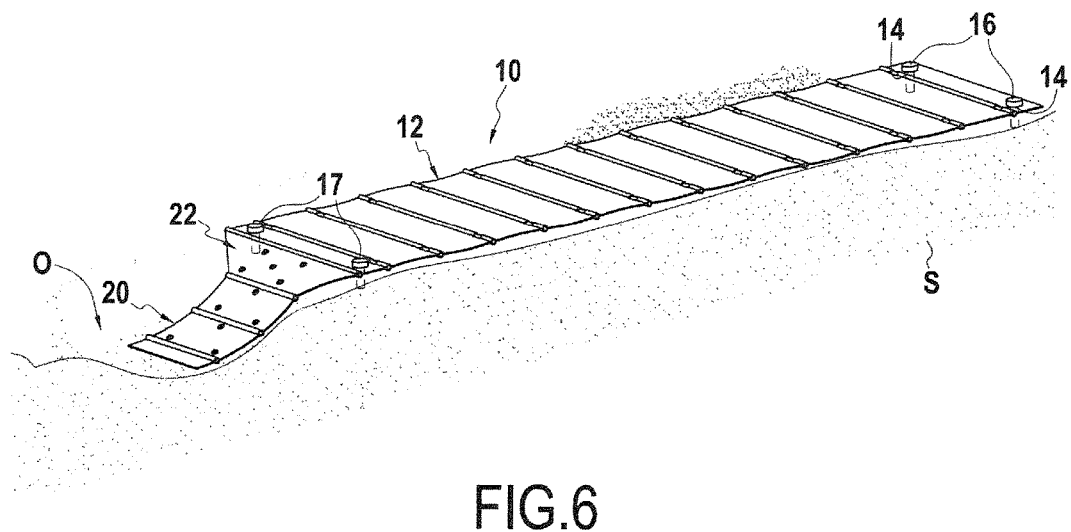
FIG. 6 shows the traction mat placed on the ground, the track starter tab being lowered and extending into a rut.

With reference now to FIG. 6, the way in which the traction mat of the invention is used is explained in more detail below.

Figure 7:
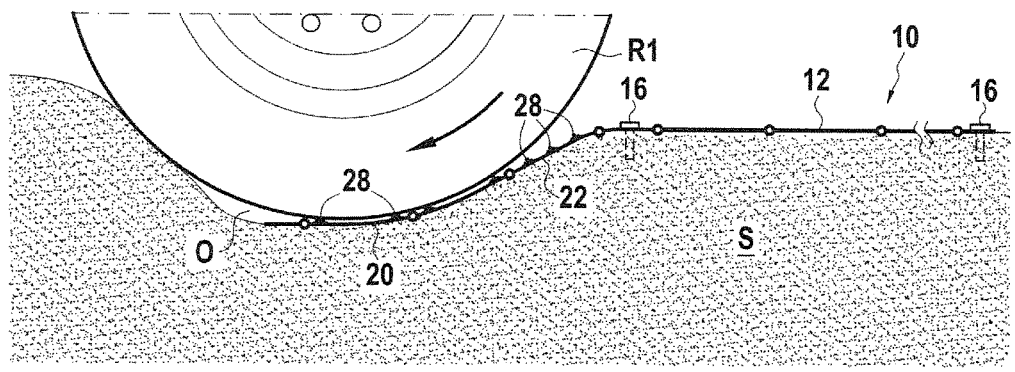
FIG. 7 is a detail view of the rut in which the wheel of the vehicle is stuck.

The mat is placed on the ground in such a manner that its main track portion is disposed in front of the vehicle ahead of the rut O, while the track starter tab is positioned at the bottom of the rut O, being engaged under the front drive wheel R1 (not shown in FIG. 7). The hinge-forming connection portion 22 makes it possible to lower the track starter tab relative to the main track portion. That makes it possible to incline and position all or part of the track starter tab under the front drive wheel R1, as shown in FIG. 7.

Since the main track portion presents a width that is substantially greater than the width of the track starter tab, and also because of the presence of the transverse stiffener elements, the main track portion remains substantially plane and is not at risk of sinking and itself forming a rut.

The mat is then fastened to the ground by means of the fastener means, in particular by means of the first orifices 14 that receive the fastener members 16.

When the front drive wheel R1 that is stuck begins to turn, the tire comes into contact with the studs. The rotation of the wheel has the effect of pulling the track starter tab under the wheel by means of which the contact area between the wheel and the track starter tab increases.

Then, more studs engage with the tire, and as a result, the grip of the wheel R1 on the track starter tab increases. Since the mat is fastened to the ground by means of fastener means, the wheel stops slipping and runs in succession on the track starter tab, on the connection portion, and then on the main track portion, whereby the front wheel R1 exits the rut O and can continue running as far as the longitudinal end of the main track portion remote from the tab 20 without risk of getting stuck.

Figure 8:
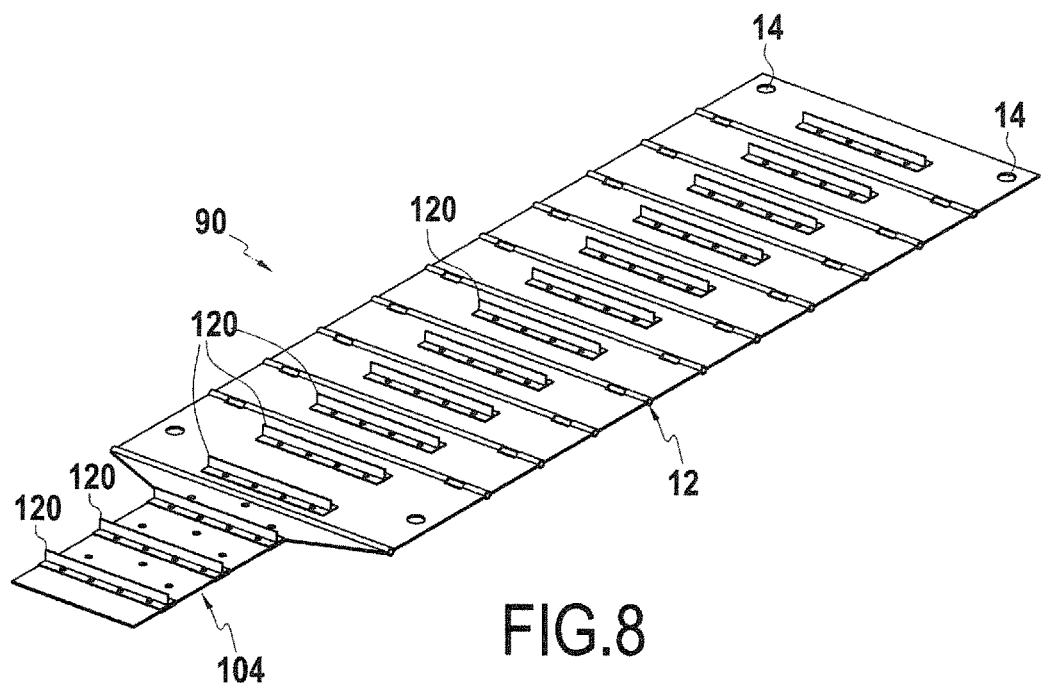
FIG. 8 shows a traction mat in a variant of the invention.

With reference now to FIG. 8, there follows a description of a variant of the traction mat of the invention.

FIG. 8 shows a variant of the traction mat of the invention that comprises a flexible body provided with a plurality of grip devices 120 that are described in detail below. These grip devices are separate from the stiffener elements 18. The traction mat 90 presents a main track portion 12 that ends in a track starter tab 20 having width that is strictly less than the width of the main track portion 12. In this embodiment, the grip devices 120 present a length that is substantially equal to half the width of the middle portion 12; the grip devices 120 are disposed in the middle of the main track portion 12 and also on the track starter tab 20.

In another configuration, without limiting the invention to this embodiment, the grip elements may extend only over the main track portion 12.

Figure 9:
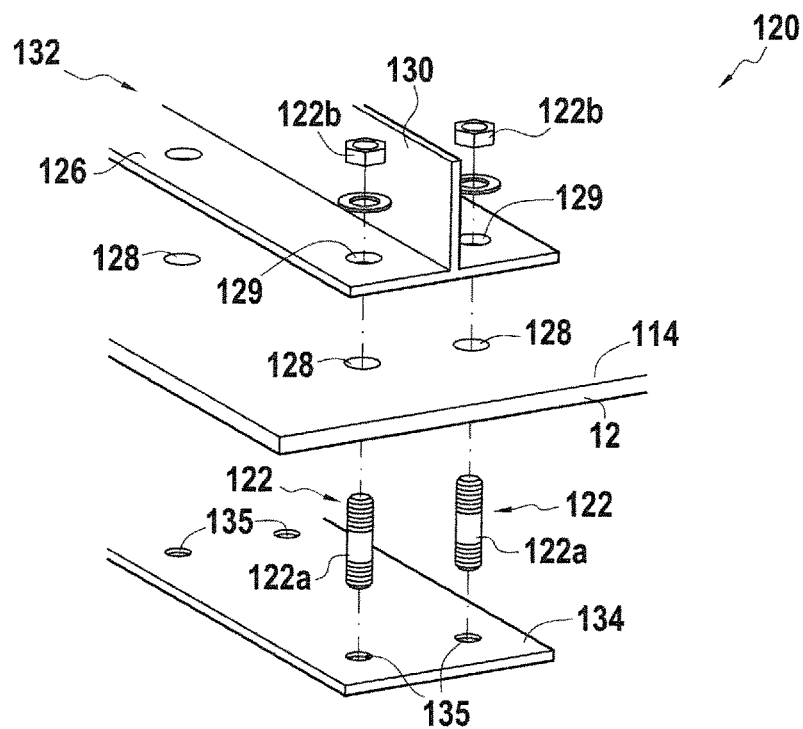
FIG. 9 is a detailed exploded view of the mat grip device in a first embodiment.

The grip devices are described in more detail below. FIG. 9 shows one of the grip devices 120 in detail, it can be seen that said device comprises a support 126 that is designed for being disposed on the top track face 114 and that extends in the transverse direction, while being fastened to the main track portion 12 by fastener elements 122.

In this non-limiting example, the fastener elements 122 are constituted by bolts 122a and by nuts 122b.

In order to fasten the support 126 to the mat 90, the mat is provided with orifices 128 that pass through the mat in its thickness direction. The support is also provided with holes 129, disposed facing the orifices 128 and through which there extend the bolts of the fastener elements 122.

The grip device 120 further comprises a first grip plate 130 that projects from the support 126. More precisely, the first grip plate 130 extends in the transverse direction T of the mat 90 and extends in a surface that is transverse to the top track face. Specifically, the first grip plate 130 is substantially perpendicular to the support 126 and to the top track face 114. Furthermore, in this example, the support 126 and the first grip plate 130 form a single part constituting a first rigid section member 132 having an upside-down "T"-shaped cross-section. This first rigid section member thus extends in the transverse direction T of the mat.

In addition, it is observed that the fastener elements 122 are disposed on either side of the first grip plate 130, which has the effect of ensuring that the grip device is held on the traction mat in very stable manner.

In order to further improve fastening of the grip device to the mat, the grip device 120 further comprises a counter-support 134 that is disposed on the bottom face 116 of the mat while being fastened to the support 126 by the fastener element(s) 122. It should therefore be understood that the mat is clamped between the support and the counter-support, which present substantially the same longitudinal and transverse dimensions.

In the embodiment in FIG. 9, the counter-support 134 is presented in the form of a plane blade that extends in the transverse direction of the mat 90. The counter-support 134 is also provided with orifices 135 in which the bolts 122a are fastened by screw-fastening. Naturally, other methods of fastening the counter-support 134 to the fastener elements 122 could be envisaged. In a variant, the bolts 122a could be made integrally with the blade of the counter-support 134.

Figure 10:
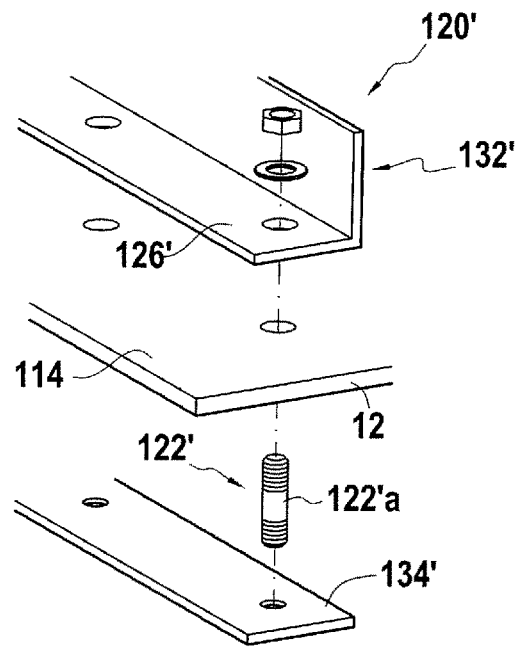
FIG. 10 is a detailed exploded view of the mat grip device in a second embodiment.

FIG. 10 shows a second embodiment of the grip device 120.

The grip device 120' of FIG. 10 differs from that of FIG. 9 by the fact that it comprises a first rigid section member 132' that presents an "L"-shaped cross section, and not an upside-down "T"-shaped cross section like in FIG. 9. The advantage of the "L"-shaped section member is that it reduces the weight of the grip devices, and therefore makes the traction mat more lightweight.

In the example of FIG. 10, provision is also made for a counter-support 134' in such a manner that the mat 90 is clamped between the counter-support 134' and the support 126'.

In another advantageous aspect of the invention, shown in FIGS. 9 and 9, the fastener elements 122' and 122", present a top end fastened to the support and a bottom end fastened to the counter-support, while forming respective protrusions or lugs extending beyond the counter-support, which protrusions have the function of forming a non-slip track shoe, which makes it possible to improve the retention of the traction mat on the ground.

Figure 11:
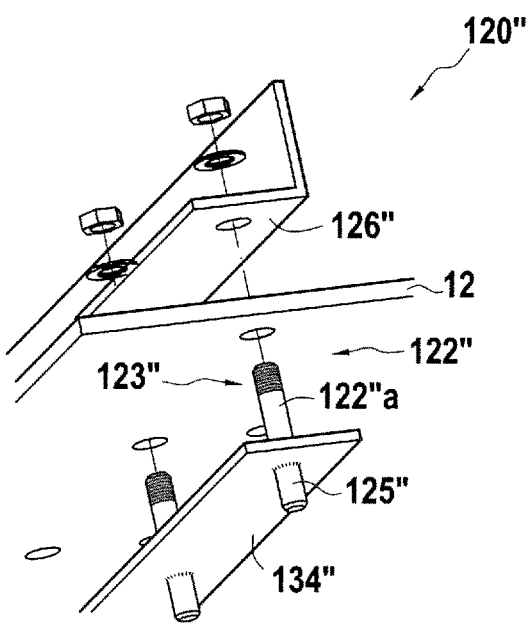
FIG. 11 is an exploded view showing a variant of the second embodiment of the grip device of FIG. 10.
Figure 12:
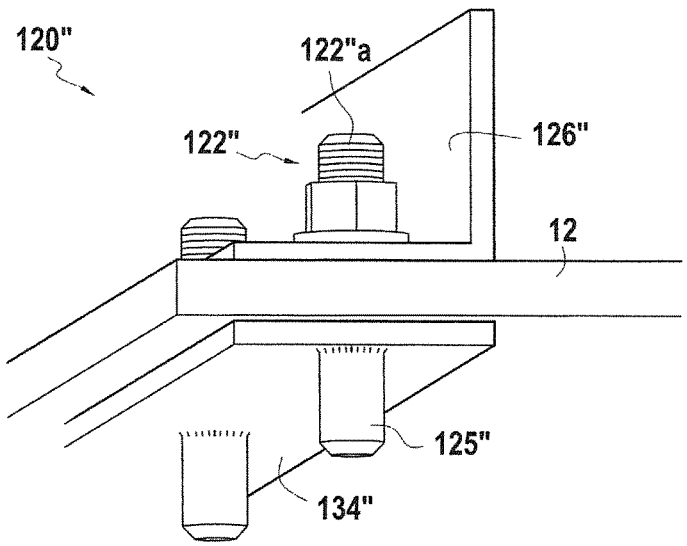
FIG. 12 shows the variant of FIG. 11 in an assembled view.

The grip device 120" shown in FIGS. 11 and 12 is a variant of the second embodiment shown in FIG. 10. In this variant, the fastener elements 122" are formed integrally with the counter-support.

Each fastener element 122" presents a top end 123" that is fastened to the support 126" and a bottom end 124" that is fastened to the counter-support 134" while also forming a protrusion 125" extending beyond the counter-support 134'. As can be seen in FIG. 12, this protrusion 125" has the function of forming a non-slip track shoe that makes it possible to improve retention of the traction mat on the ground.

A third embodiment of the grip device of the mat of the invention is described below with reference to FIG. 13.

Figures 13, 14:
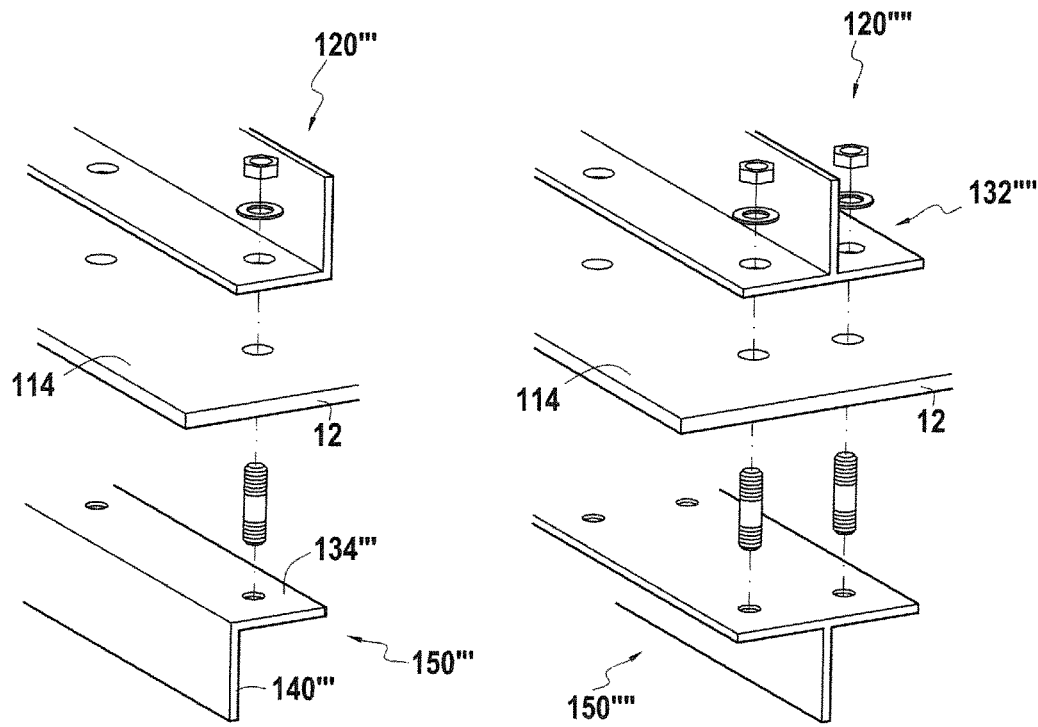
FIG. 13 is a detailed exploded view of the mat grip device in a third embodiment.
FIG. 14 is an exploded view showing a variant of the second embodiment of the grip device of FIG. 8.

The grip device 120''' shown in FIG. 13 differs from the grip device 120' shown in FIG. 10 by the fact that it further comprises a second grip plate 140''' that extends from the counter-support 134''' and that extends in the transverse direction of the mat 90. Furthermore, the second grip plate 140''' extends in a surface transverse to the bottom face 116 of the mat 90.

As can be seen in FIG. 13, the counter-support 134''' and the second grip plate 140''' form a single part constituting a second rigid section member 150''' that extends in the transverse direction of the mat. In the embodiment of FIG. 13, the cross section of the second rigid section member 150''' presents an "L" shape similar to that of the first rigid section member of the grip device of FIG. 10. The grip device 120" of FIG. 14 is a variant of the third embodiment of FIG. 13 that differs by the fact that the cross sections of the first and second rigid section members are "T"-shaped, like the first rigid section member shown in FIG. 9. This "T"-shape configuration presents the advantage of ensuring that the traction mat 90 is retained excellently on the ground while also conferring better fastening of the grip device to the mat insofar as the first and second rigid "T"-shaped section members are fastened by means of two series of fastener elements disposed on either side of the first and second grip plates.

The invention is not limited to the embodiments presented, but extends to all variants within the ambit of the scope of the claims.

The invention claimed is:

1. A roll-up traction mat for a vehicle having at least one wheel, said traction mat having a bottom face and a top face constituting a running track, and comprising:
   a roll-up main track portion, as well as a track starter tab that is fastened to a first end of the main track portion by a hinge-forming connection portion arranged to lower the track starter tab relative to the main track portion, by means of which the track starter tab can be positioned at the bottom of a rut in which said wheel of the vehicle is stuck, the track starter tab comprising:
      a plurality of stiffener elements extending transversely and a top face provided with studs, wherein the main track portion and the track starter tab are constituted by at least one textile layer covered in a polymer layer.

2. The traction mat according to claim 1, wherein the track starter tab presents a width that is substantially less than the width of the main track portion.

3. The traction mat according to claim 1, wherein the track starter tab presents a width lying in the range 15 cm to 40 cm.

4. The traction mat according to claim 1, wherein the hinge-forming connection portion is flexible.

5. The traction mat according to claim 1, wherein the hinge-forming connection portion presents a first end edge connected to the main track portion and a second end edge connected to the track starter tab, the width of the first end edge being greater than the width of the second end edge.

6. The traction mat according to claim 1, wherein the main track portion presents a length that is substantially greater than the length of the track starter tab.

7. The traction mat according to claim 1, wherein the track starter tab presents a length lying in the range 30 cm to 70 cm.

8. The traction mat according to claim 7, wherein the main track portion and/or the hinge-forming connection portion also comprises a top face provided with studs in continuity with the studs of the track starter tab.

9. The traction mat according to claim 1, wherein the track starter tab is detachable from the main track portion.

10. The traction mat according to claim 1, wherein the main track portion presents a second end, remote from the first end, which second end includes means for fastening the mat to the ground.

11. The traction mat according to claim 10, wherein the means for fastening the mat to the ground comprise at least one orifice designed to cooperate with a fastener member.

12. The traction mat according to claim 1, wherein the main track portion further comprises at least one grip device for increasing drivability of the vehicle, said grip device extending in the transverse direction by projecting from the top track face while being fastened to the mat by at least one fastener element so as to form a non-slip track shoe.

13. The traction mat according to claim 12, wherein the grip device comprises:

a support disposed on the top track face and extending in the transverse direction while being fastened to said traction mat by the fastener element; and a first grip plate projecting from the support and extending in the transverse direction of the traction mat, in such a manner as to extend in a surface transverse to the top track face.

14. The traction mat according to claim 13, wherein the support and the first grip plate form a single part constituting a first rigid section member extending in the transverse direction of the mat.

15. The traction mat according to claim 13, wherein the grip device further comprises a counter-support disposed on the bottom face while being fastened to the support by the fastener element.

16. The traction mat according to claim 15, wherein the grip device further comprises a second grip plate projecting from the counter-support and extending in the transverse direction, in such a manner as to extend in a surface that is transverse to the bottom face of the mat.

17. The traction mat according to claim 16, wherein the counter-support and the second grip plate form a single part constituting a second rigid section member extending in the transverse direction of the mat.

18. The traction mat according to claim 15, wherein the fastener element presents a top end fastened to the support and a bottom end fastened to the counter-support forming a protrusion extending beyond the counter-support so as to form a non-slip track shoe.

19. The traction mat according to claim 13, wherein the fastener element is a bolt passing through the flexible body while being fastened to the support by a nut.

* * * * *